US010831500B2

(12) United States Patent
Guérin et al.

(10) Patent No.: US 10,831,500 B2
(45) Date of Patent: Nov. 10, 2020

(54) ADAPTIVE LOCKING IN ELASTIC THREADING SYSTEMS

(71) Applicant: INTERNATIONAL BUSINESS MACHINES CORPORATION, Armonk, NY (US)

(72) Inventors: Xavier Rene Guérin, Yorktown Heights, NY (US); Scott Schneider, Yorktown Heights, NY (US); Xiang Ni, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 16/004,412

(22) Filed: Jun. 10, 2018

(65) Prior Publication Data

US 2019/0377582 A1   Dec. 12, 2019

(51) Int. Cl.
*G06F 9/38* (2018.01)
*G06F 9/30* (2018.01)
*G06F 9/50* (2006.01)

(52) U.S. Cl.
CPC .......... *G06F 9/3851* (2013.01); *G06F 9/3009* (2013.01); *G06F 9/5027* (2013.01)

(58) Field of Classification Search
CPC ..... G06F 9/3851; G06F 9/3009; G06F 9/5027
See application file for complete search history.

(56) References Cited

U.S. PATENT DOCUMENTS

| 7,707,578 B1 | 4/2010 | Zedlewski et al. |
| 8,572,355 B2 | 10/2013 | Rozas et al. |
| 8,910,124 B1 * | 12/2014 | Bhansali ............. G06F 11/3466 717/127 |

(Continued)

FOREIGN PATENT DOCUMENTS

| CN | 105975349 A | 9/2016 | |
| WO | WO-2018076796 A1 * | 5/2018 | ............... G06F 9/52 |

OTHER PUBLICATIONS

Payer, M. et al., "Generating Low-Overhead Dynamic Binary Translators"; SYSTOR (2010); 14 pgs; Haifa, Isarel.

(Continued)

*Primary Examiner* — Jung W Kim
*Assistant Examiner* — Bruce S Ashley
(74) *Attorney, Agent, or Firm* — Intellek Law Group, PLLC; Gabriel Daniel, Esq.

(57) ABSTRACT

A multithreading system that performs elastic threading and dynamic patching is provided. The system receives a compiled object of a computing process, the compiled object comprising a set of locking instructions for ensuring exclusive access of a resource by the computing process. The system determines a thread count for the computing process. When the thread count indicates that a single thread is allocated to execute the computing process, the system patches the compiled object with a set of no-operation (NOP) instructions in place of the set of locking instructions. When the thread count indicates that two or more threads are allocated to execute the computing process, the system patches the compiled object with the set of locking instructions in place of the set of NOP instructions. The system executes the computing process according to the patched compiled object.

20 Claims, 8 Drawing Sheets

(56) References Cited

U.S. PATENT DOCUMENTS

| | | | |
|---|---|---|---|
| 8,972,994 B2* | 3/2015 | Srinivas | G06F 9/528 |
| | | | 718/100 |
| 9,304,940 B2 | 4/2016 | Dixon et al. | |
| 9,390,369 B1 | 7/2016 | Sinyayskiy et al. | |
| 9,513,905 B2 | 12/2016 | Smelyanskiy et al. | |
| 2007/0094453 A1* | 4/2007 | Santhanakrishnan | ........................ |
| | | | G06F 12/0862 |
| | | | 711/137 |
| 2008/0184194 A1* | 7/2008 | Gaither | G06F 9/3851 |
| | | | 717/107 |
| 2012/0167106 A1* | 6/2012 | Shpeisman | G06F 9/52 |
| | | | 718/102 |
| 2016/0320984 A1 | 11/2016 | Tamura et al. | |
| 2017/0139757 A1 | 5/2017 | Mansell et al. | |

OTHER PUBLICATIONS

Rajwar, R. et al., "Going Under the Hood with Intel's Next Generation Microarchitecture Codename Haswell"; Intel Corporation (2012); 39 pgs.; San Fransisco, CA USA.

* cited by examiner

ADAPTIVE LOCKING IN ELASTIC THREADING SYSTEMS

BACKGROUND

Technical Field

The present disclosure generally relates to multi-thread processing by computer processors.

Description of the Related Art

Multithreading is the ability of a central processing unit (CPU) or a single core in a multi-core processor to execute multiple processes or threads concurrently, appropriately supported by the operating system. In multithreading, the processes and threads share the resources of a single or multiple cores. The multithreading paradigm has become more popular in recent years. Since most computer systems are actually multitasking among multiple threads or programs, techniques that improve the throughput of all tasks result in overall performance gains.

SUMMARY

Some embodiments of the disclosure provide a multi-threading system that performs elastic threading and dynamic patching. The system receives a compiled object of a computing process, the compiled object including a set of locking instructions for ensuring exclusive access of a resource by the computing process. The system determines a thread count for the computing process. When the thread count indicates that a single thread is allocated to execute the computing process, the system patches the compiled object with a set of no-operation (NOP) instructions in place of the set of locking instructions. When the thread count indicates that two or more threads are allocated to execute the computing process, the system patches the compiled object with the set of locking instructions in place of the set of NOP instructions. The system executes the computing process according to the patched compiled object.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

An elastic threading system is a parallel processing system in which the number of threads allocated to execute a computation atom is dynamically varied in order to exploit data parallelism and increase throughput. When multiple threads are running, locks are used to prevent parallel accesses to the certain critical resource in order to ensure data consistency. When only a single thread is running, such locks become superfluous since there is no possibility of concurrent access of the same critical resource. Unfortunately, locking instructions remain present in the code path of the computation atom regardless of whether the running thread count varies from 1 to K or from K to 1. The presence of the locking instructions may cause locks to be unnecessarily acquired and released. Even if the locking instructions are conditionally executed, avoiding the expense of executing the unnecessary operations in locking instructions may require activating the processor's branch prediction and out-or-order execution engine.

Some embodiments of the disclosure provide a system that uses the principle of trampolines to dynamically activate or deactivate a computation atom's locking instructions. Specifically, the system dynamically optimizes locking strategies in the scope of running threads based on locking instructions that synchronize the usage of resources. In some embodiments, a compiler may generate locking and unlocking instructions around the computation atom's critical sections when creating a compiled object of the computation atom. When executing the compiled object in a multithreading environment, a run-time module performs an elastic threading process by dynamically patching the locking and unlocking instructions based on the number of running threads allocated or assigned to the computation atom. Specifically, if the number of running threads is reduced to one, the run-time module patches in no-operation (NOP) instructions in place of the locking and unlocking instructions. If the number of running thread is two or more, the run-time module keeps or restores the locking and unlocking instructions. The run-time module identifies which computation atoms to patch and patches the identified computation atoms prior to executing the computation atoms in the multithreaded environment.

In some embodiments, the compiler generates placeholders made of one or more NOP instructions around the operator's critical sections requiring locking. If more running threads are created as a result of an elastic threading decision, the runtime module dynamically replaces the NOPs in the placeholders with jump, branch, or call instructions to lock/unlock functions or routines. If the number of running threads is reduced to one as a result of an elastic threading decision, the runtime dynamically restores the NOP instruction in the placeholders.

Figure 1:
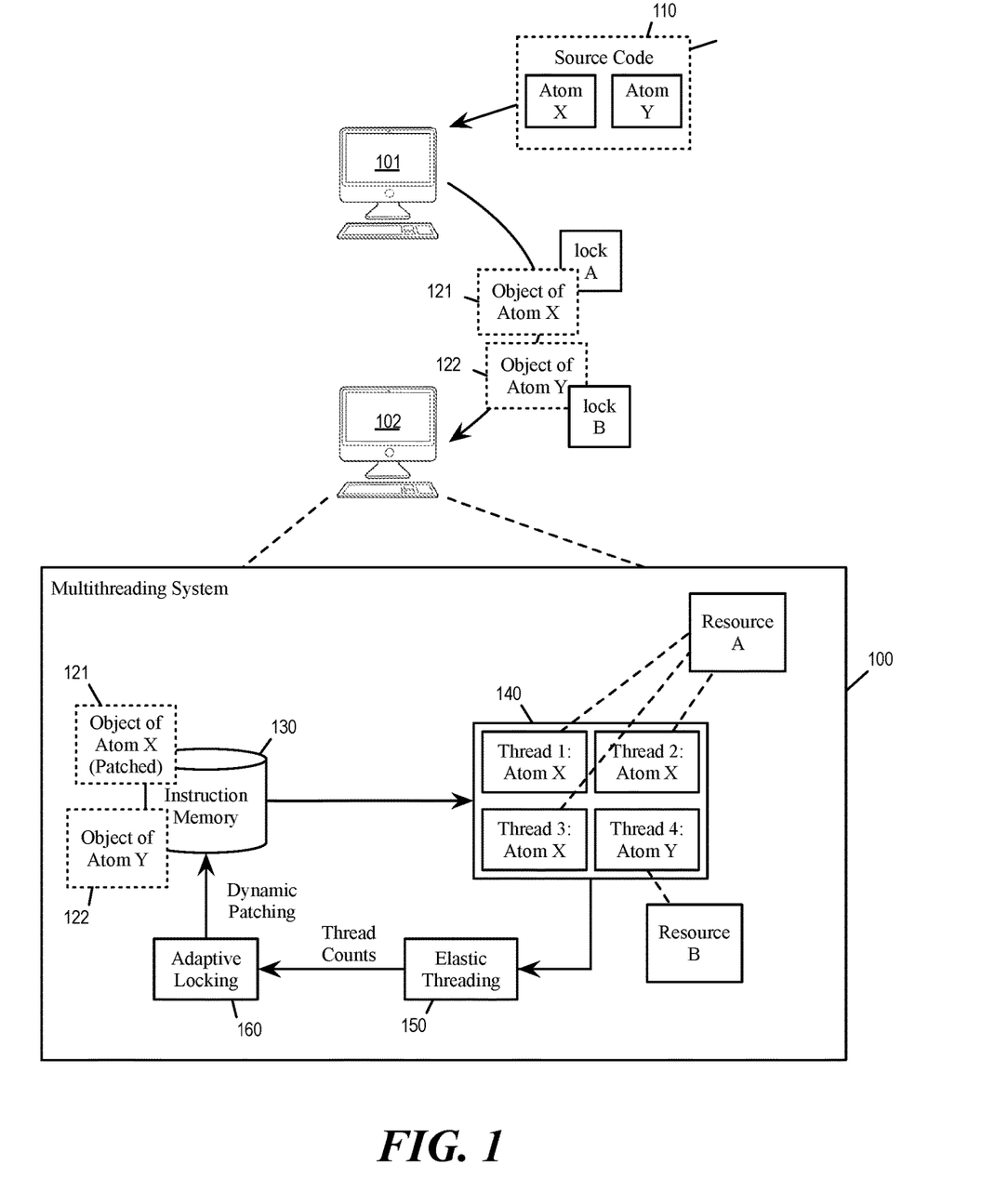
FIG. 1 conceptually illustrates a multithreading environment that performs elastic threading and dynamic patching for computation atoms, consistent with an exemplary embodiment.

FIG. 1 conceptually illustrates a multithreading environment 100 that performs elastic threading and dynamic patching for computation atoms, consistent with an exemplary embodiment. In the figure, the source code of an application is compiled into objects for computation atoms. The compiled objects have locking and unlocking instructions around the critical sections of the computation atoms. The compiled objects are executed in the multithreading environment 100, which performs the elastic threading process by determining the number of running threads allocated to each computation atom and by dynamically patching each computation atom based on the number of running threads allocated.

As illustrated, a compiler implemented at a compiler computing device 101 compiles the source code 110 into compiled objects. The compiled objects are executed at the multithreading environment 100 that is implemented at a run-time computing device 102. The compiler computing device 101 and the run-time computing device 102 can be a same computing device or different computing devices. An example data processing system 800 that implement the computing devices 101 and/or 102 will be described by reference to FIG. 8 below.

The source code 110 is that of an application that performs various computation tasks or algorithms. These computation tasks are divided or encapsulated into various routines or modules. Each of these modules performs a computing process that includes one or more operations. Such a module is referred to as an operator or a computation atom for the application. In the example of FIG. 1, the source code 110 includes a module for computation atom X and a module for computation atom Y. The compiler computing device 101 compiles the source code 110 into compiled objects, including an object 121 for the computation atom X and an object 122 for the computation atom Y.

Some of these computation atoms perform processes that can be concurrently executed by multiple threads to increase throughput. Different instances of the same computation atom may involve access to a common resource (e.g., a global variable, a state variable, a memory location, an input/output port, etc.). However, concurrent access to the common resource may result in corruption of data. Embedding locking and unlocking statements in a computation atom ensures only one instance of the computation atom has exclusive access to the resource at any given time. In the example of FIG. 1, the computation atom X includes statements for locking and unlocking resource A, while the computation atom Y includes statements for locking and unlocking resource B. The source code 110 may include the requisite locking and unlocking statements, which the compiler compiles into the locking and unlocking instructions. In some embodiments, the compiler generates the requisite locking and unlocking instructions when creating the compiled objects.

Figure 2:
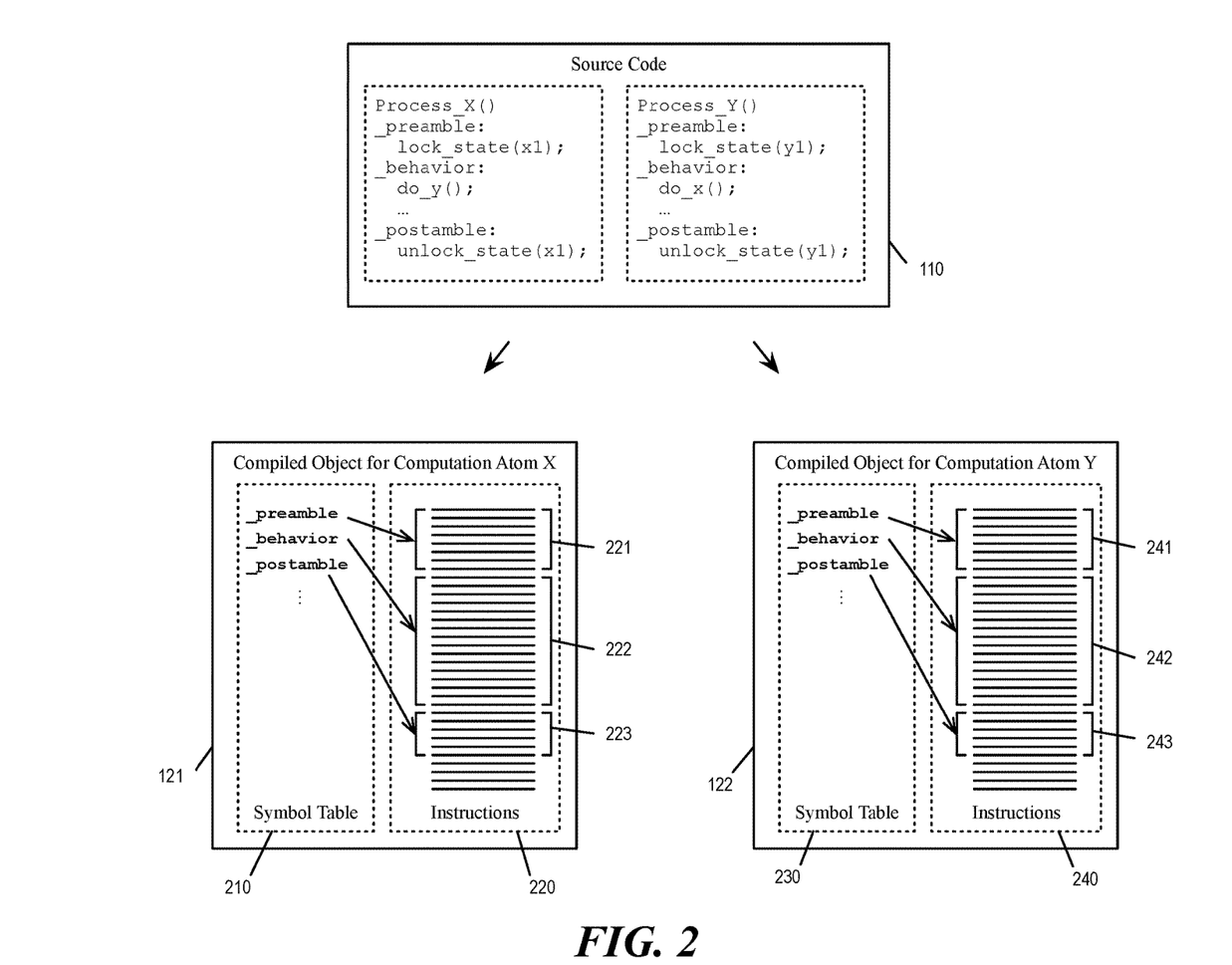
FIG. 2 conceptually illustrates compiled objects in which the locking and unlocking instructions are identified as preambles and postambles, consistent with an exemplary embodiment.

In some embodiments, the compiler produces objects in which the locking and unlocking instructions are identified as preambles and postambles around critical behavior codes. Such identification is used by the multithreading system 100 to perform dynamic patching. FIG. 2 conceptually illustrates compiled objects in which the locking and unlocking instructions are identified as preambles and postambles, consistent with an exemplary embodiment.

The figure illustrates example content of the source code 110, compiled object 121, and compiled object 122. The source code 110 includes codes for the computation atom X and the computation atom Y, which are respectively compiled into the objects 121 and 122.

Each compiled object includes a symbol table and a set of instructions. The symbol table includes symbols that point to specific sections within the set of instructions. Such symbols may serve as function entry points, global variables, etc. The object 121 includes a symbol table 210, which includes symbols "_preamble", "_behavior", and "_postamble". The object 121 also includes instructions 220, which includes sections 221, 222, and 223. The symbol "_preamble" points to the section 221, which corresponds to locking instructions that secure exclusive access of a resource for computation atom X. The symbol "_behavior" points to the section 222, which corresponds to critical operations or behavior codes of computation atom X that require the exclusive access to prevent data corruption. The symbol "_postamble" points to the section 223, which corresponds to unlocking instructions that release the resource from computation atom X (so other instances of computation atom X may use the resource).

Likewise, the object 122 includes a symbol table 230 that includes symbols "_preamble", "_behavior", and "_postamble" and instructions 240 that include sections 241, 242, and 243. The symbol "_preamble" points to the section 241, which corresponds to locking instructions of computation atom Y. The symbol "_behavior" points to the section 242, which corresponds behavior codes of computation atom Y. The symbol "_postamble" points to the section 243, which corresponds to unlocking instructions of computation atom Y.

As illustrated in FIG. 1, the compiled objects 121 and 122 are provided to the run-time computing device 102 to be executed. The run-time computing device 102 is configured to implement the multithreading system 100 that dynamically determines the number of processing thread allocated to executing each computation atom, including the computation atom X (in object 121) and the computation atom Y (in object 122).

The run-time computing device 102 stores the compiled objects 121 and 122 at an instruction memory 130. A processor 140 (or multiple processors) performs operations specified by the instructions stored in the instruction memory 130, including the instructions of the compiled objects 121 and 122. The processor 140 implements the multithreading system 100 by running multiple computing threads that may perform processes for different computation atoms. In the example, the processor 140 allocates three computing threads (threads 1, 2 and 3) to performing computation atom X and one computing thread to performing computation atom Y (thread 4). When a computation atom is allocated more than one computing thread, its locking and unlocking instructions are executed to ensure different instances of the same computation atom do not concurrently access a same resource. In the example, the computation atom X requires accessing resource A, and the three threads of computation atom X synchronizes their access of resource A by executing the locking and unlocking instructions of computation atom X.

The multithreading system 100 includes an elastic threading module 150 and an adaptive locking module 160. The elastic threading module 150 and the adaptive locking module 160 may be modules of software instructions being executed by one or more processing units (e.g., the processor 140) of the computing device 102. The elastic threading module 150 and the adaptive locking module 160 may also be modules of hardware circuits implemented by one or more integrated circuits (ICs) of an electronic apparatus in the computing device 102. Though the modules 150 and 160 are illustrated and described as separate modules, they can be combined into a single module.

The elastic threading module 150 determines how many running threads to allocate to each computation atom, while the adaptive locking module 160 dynamically patches the instructions stored in the instruction memory (including the instructions of computation atom X and computation atom Y) based on the number of threads allocated to each process. The dynamic patching process takes place before the patched instructions are fetched for multithreaded, concurrent execution at the processor 140.

Figure 3:
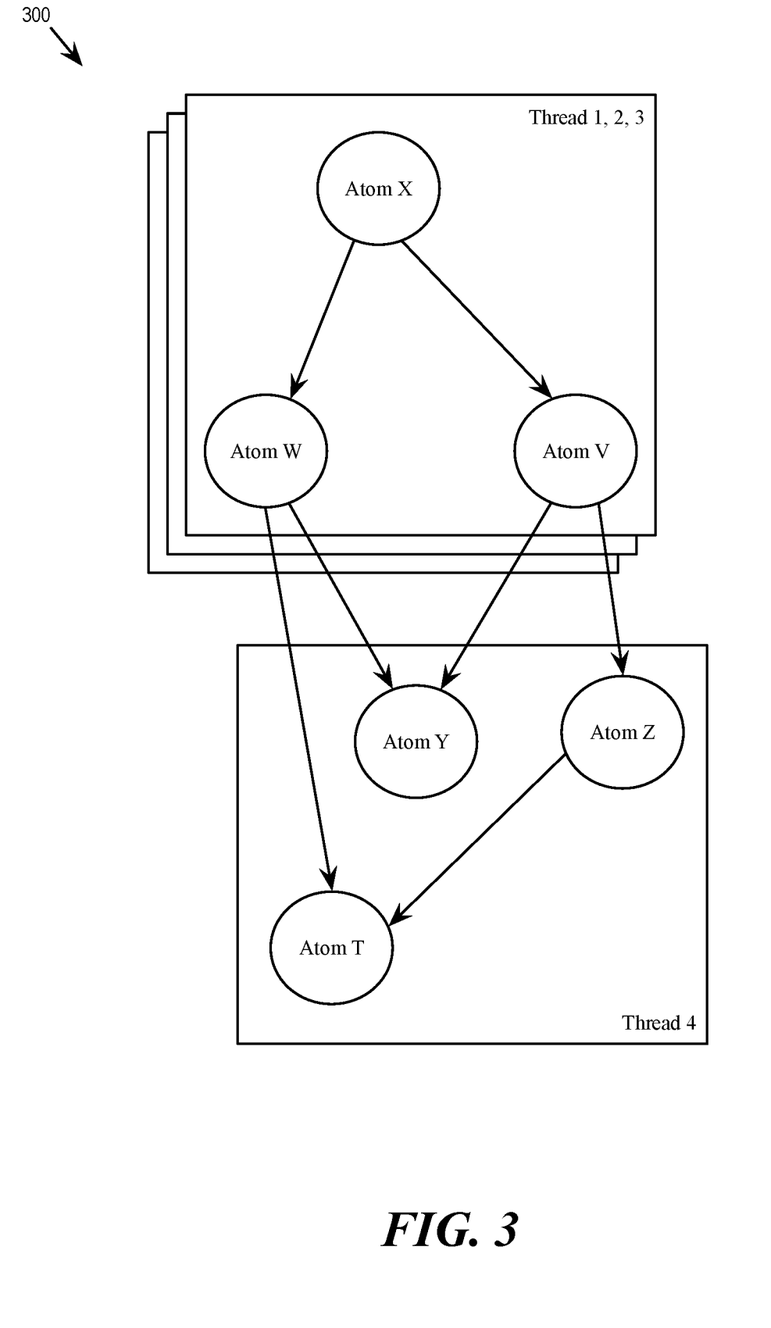
FIG. 3 illustrates an example stream graph according to which the computation atoms are allocated processing threads at the run-time computing device.

In some embodiments, the multithreading system 100 operates according to a stream graph that specifies the logical relationship between different computation atoms. The elastic threading module 150 uses the stream graph to identify which computation atoms to allocate running threads to, and the adaptive locking module 160 patches the identified computation atoms based on the number of threads allocated. FIG. 3 illustrates an example stream graph 300 according to which the computation atoms are allocated processing threads at the run-time computing device 102. The stream graph 300 specifies the logical relationship between computation atoms T, V, W, X, Y, and Z. The stream graph 300 also illustrates the allocation of processing threads 1, 2, 3, and 4 to the computation atoms.

Figure 4:
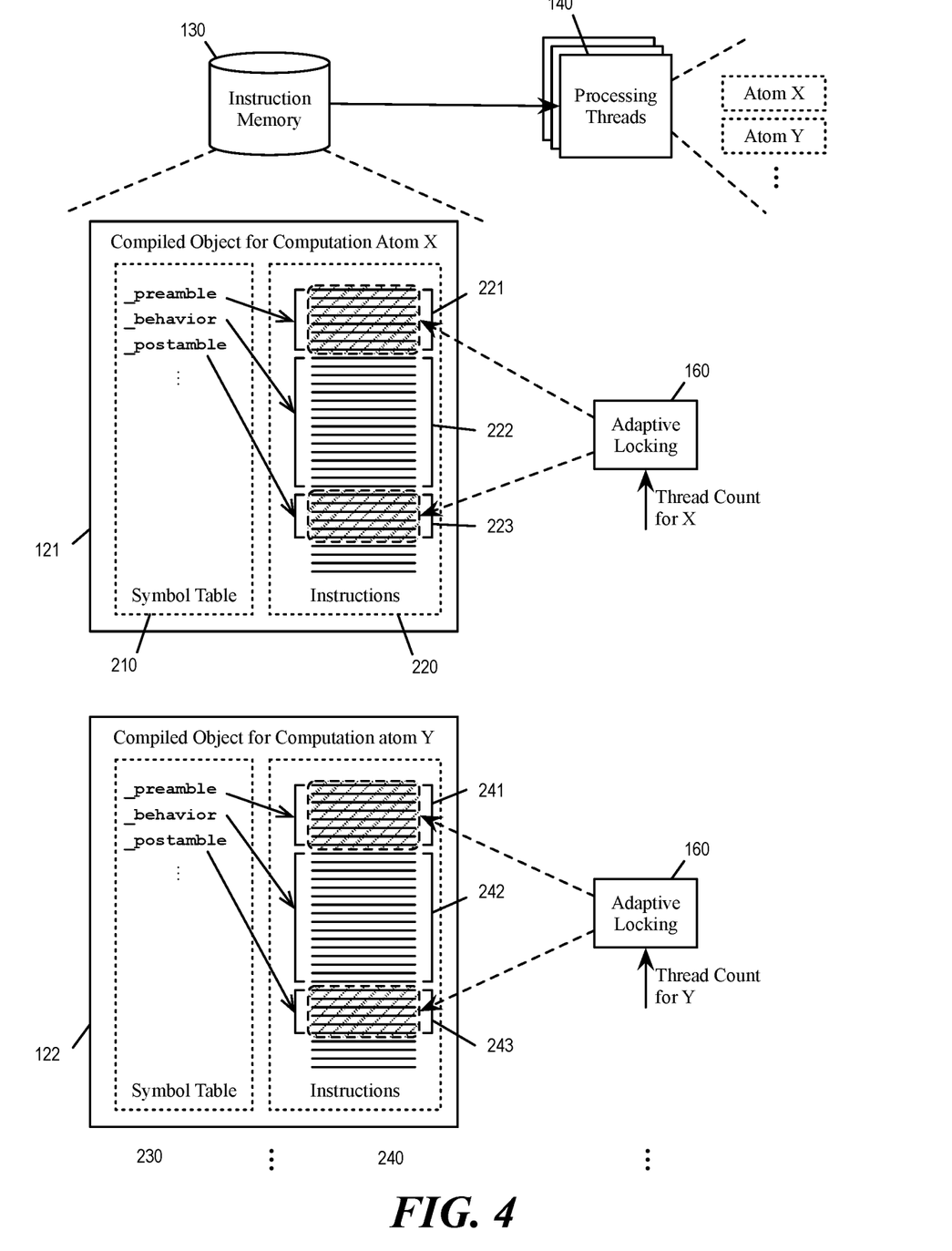
FIG. 4 conceptually illustrates dynamic patching of locking and unlocking instructions in an elastic threading system, consistent with an exemplary embodiment.

The adaptive locking module 160 performs run-time dynamic patching of a computation atom by replacing locking and unlocking instructions of the computation atom with placeholder instructions, or NOPs. Specifically, the adaptive locking module 160 identifies sections of the instructions of the computation atom that correspond to locking and unlocking instructions by using preamble and postamble symbols in the symbol table of the corresponding compiled object. FIG. 4 conceptually illustrates dynamic patching of locking and unlocking instructions in an elastic threading system, consistent with an exemplary embodiment.

As illustrated, the instruction memory 130 stores compiled objects for various computation atoms, including the compiled objects 121 and 122 of computation atom X and computation atom Y. The adaptive locking module 160 receives thread counts for different computation atoms and patches the instructions of those computation atoms based on the received thread counts. The adaptive locking module 160 also uses the symbol tables of the compiled objects to locate sections of the instructions to needs to be patched. For example, the adaptive locking 160 uses the "_preamble" and "postamble" symbols of the symbol table 210 to locate the locking section 221 and the unlocking section 223 when patching the compiled object for computation atom X. Likewise, the adaptive locking module 160 uses the "_preamble" and "postamble" symbols of the symbol table 230 to locate the locking section 241 and the unlocking section 243 when patching the compiled object for computation atom Y.

Once the adaptive locking module 160 identifies a section of instructions to patch, it replaces or overwrites the instruction within with NOPs. Since the sizes (number of bytes) of the locking and unlocking sections in the compiled objects are static, and a NOP instruction is typically identical or smaller than that of other instructions, the adaptive locking module 160 can patch a section of locking or unlocking instructions with matching number NOP instructions. In some embodiments, the adaptive locking module 160 may determine the number of NOP instructions to patch in from the pointers in the symbol table.

Figure 5A:
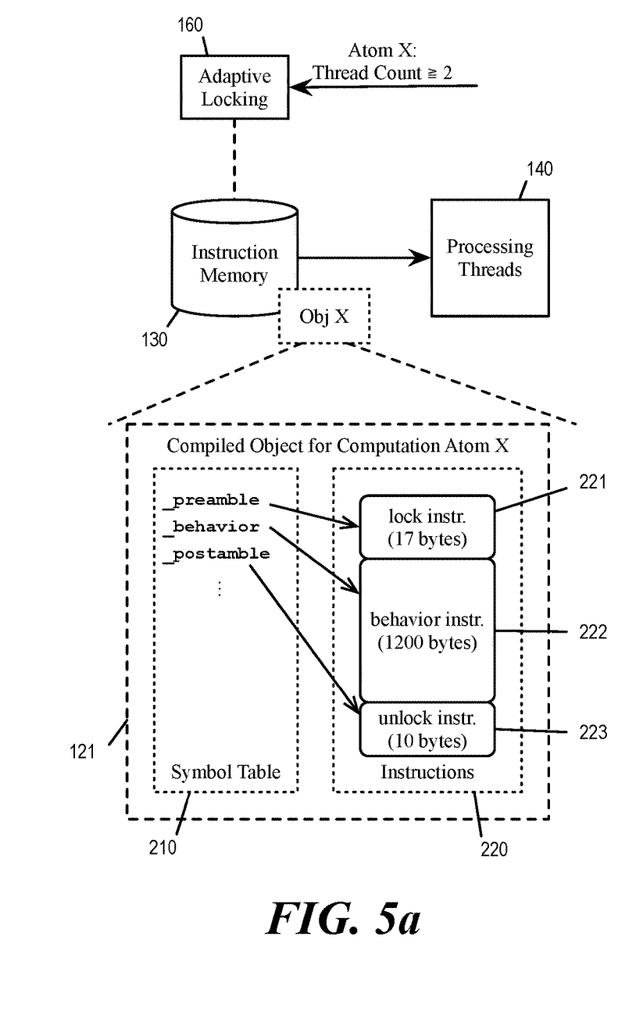
FIG. 5a-b conceptually illustrate the dynamic patching of a computation atom with NOPs when the number of processing threads assigned to the computation atom decreases to 1, consistent with an exemplary embodiment.
Figure 5B:
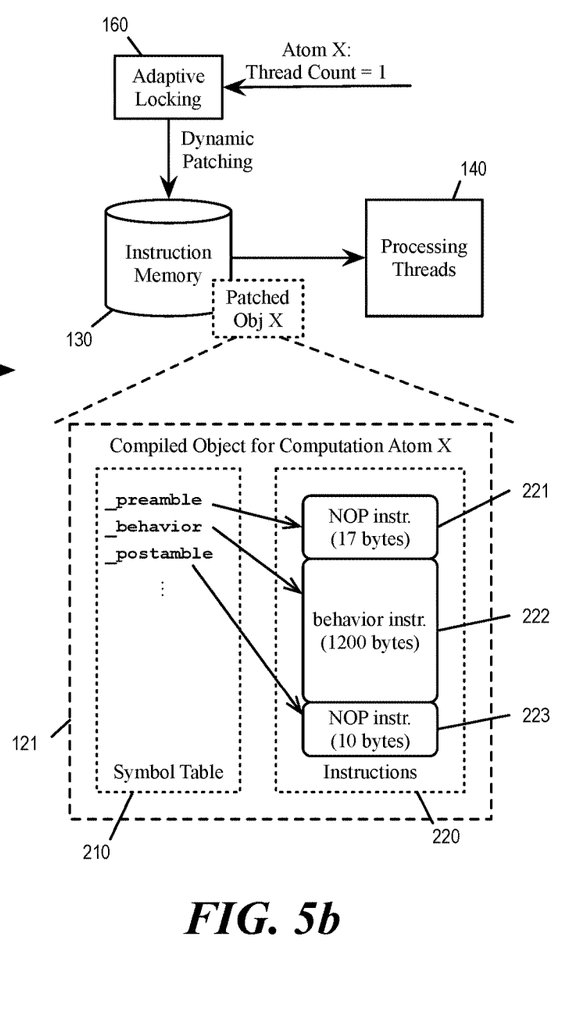

As mentioned, the multithreading system 100 provided by the run-time computing device 102 is an elastic threading system in which the number of computing threads allocated to a given process or computation atom may vary from 1 to K or from K to 1 during run-time, K being an integer larger than 1. FIG. 5*a-b* conceptually illustrate the dynamic patching of a computation atom with NOPs when the number of processing threads assigned to the computation atom decreases to 1, consistent with an exemplary embodiment.

FIG. 5*a* illustrates the instructions of the computation atom X prior to dynamic patching. The figure illustrates the original content of the compiled object 121 as generated by the compiler. At this initial state, the symbols in the symbol table 210 are pointing at sections 221, 222, and 223, which are respectively filled with locking instructions, behavior instructions, and unlocking instructions. The section 221 of locking instructions occupies 17 bytes. The section 222 of behavior instructions occupies 1200 bytes. The section 223 of unlocking instructions takes up 10 bytes. The locking and unlocking instructions include jump, call, or branching instructions that are not NOP instructions. The adaptive locking module 160 leaves the locking and unlocking instructions in their place as long as the thread count for computation atom X remain larger than 2 (i.e., at least two processing threads are allocated to perform computation atom X).

FIG. 5*b* illustrates the instructions of computation atom X when the number of threads allocated to computation atom X is reduced to 1. The figure illustrates the altered content of the compiled object 121 due to dynamic patching. Since there is little risk of data corruption when only one processing thread is allocated to computation atom X, the locking and unlocking instructions are not needed. As illustrated, the adaptive locking module 160 has replaced or overwritten the content of the locking section 221 with 17 bytes of NOP instructions and the content of the unlock section 223 with 10 bytes of NOP instructions. The one processing thread performing computation atom X based on the patched object 121 would therefore execute NOPs in place of the locking and unlocking instructions.

Figure 6A:
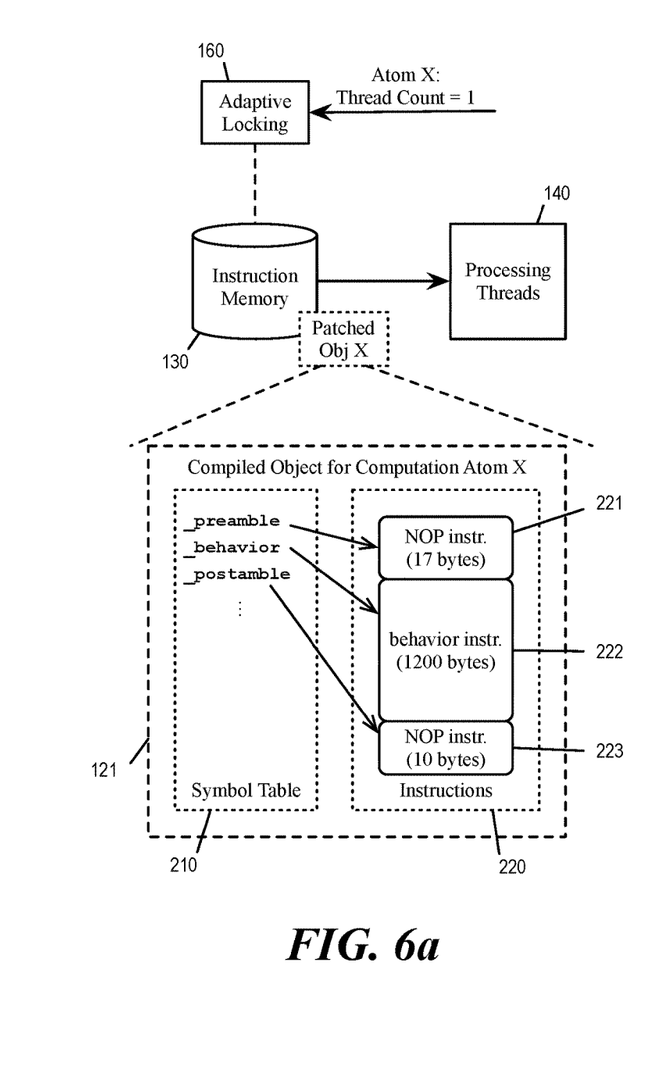
FIG. 6a-b conceptually illustrate the restoration of locking and unlocking instructions when the number of processing threads assigned to the computation atom increases to two or more, consistent with an exemplary embodiment.
Figure 6B:
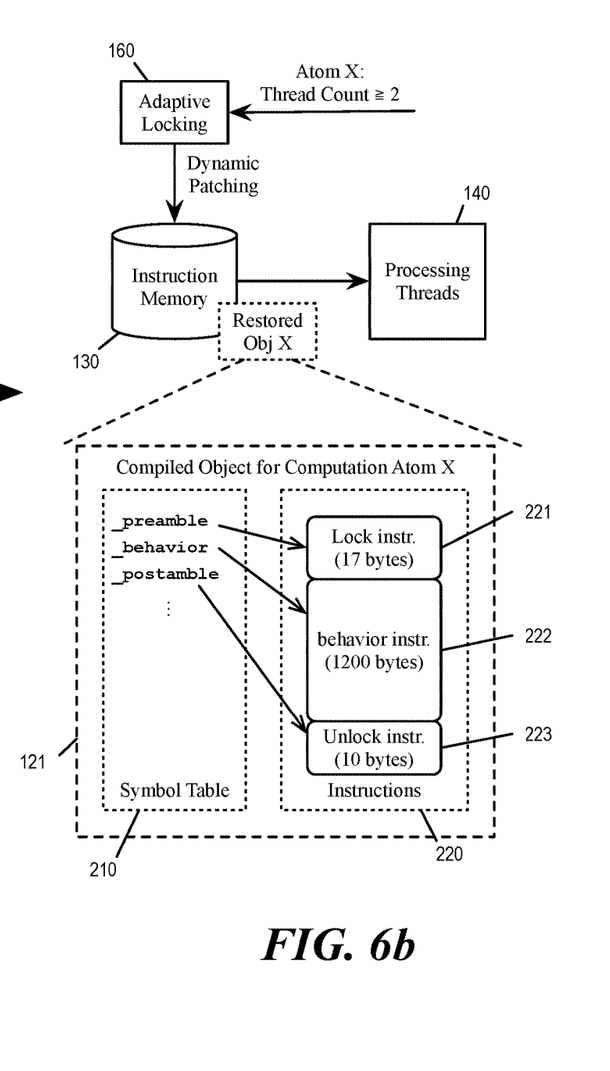

Different embodiments implement the overwriting of locking and unlocking instructions differently. In some embodiments, the same physical memory locations storing the locking and unlocking instructions are overwritten with NOP instructions. In some embodiments, the pointers associated with preamble and postamble symbols are overwritten to point to a memory region storing NOP instructions. In some embodiments, the locking and unlocking instructions of a computation atom are copied to a memory location in a same name space as the computation atom so that the locking and unlocking instructions can be located and restored when the thread count of the process increase to two or more. FIG. 6a-b conceptually illustrate the restoration of locking and unlocking instructions when the number of processing threads assigned to the computation atom increases to two or more, consistent with an exemplary embodiment.

FIG. 6a illustrates the instructions of computation atom X prior to restoration of locking and unlocking instructions. The figure illustrates the altered content of the compiled object 121 following the dynamic patching as illustrated in FIG. 5b, i.e., a previous dynamic patching process has replaced the locking and unlocking instructions with NOPs. The number of processing thread allocated to computation atom X remains 1, so that the NOP instructions remain in place of the locking and unlocking instructions at the compiled object 121. Though not illustrated, a copy of the locking and unlocking instructions is kept in a memory location that is in the same name space as computation atom X.

FIG. 6b illustrates the instructions of computation atom X when the number of threads allocated to computation atom X increases to two or more. The figure illustrates the restored content of the compiled object 121 due to dynamic patching. Since multiple processing threads are allocated to computation atom X, the locking and unlocking instructions are once again needed. As illustrated, the adaptive locking module 160 has replaced 17 bytes of NOPs in section 221 with the original locking instructions and the 10 bytes of NOPs in section 223 with the original unlocking instructions. The original locking and unlocking instructions are restored from memory locations in the name space of computation atom X. The processing threads performing computation atom X based on the restored object 121 would henceforth execute the restored locking and unlocking instructions.

Figure 7:
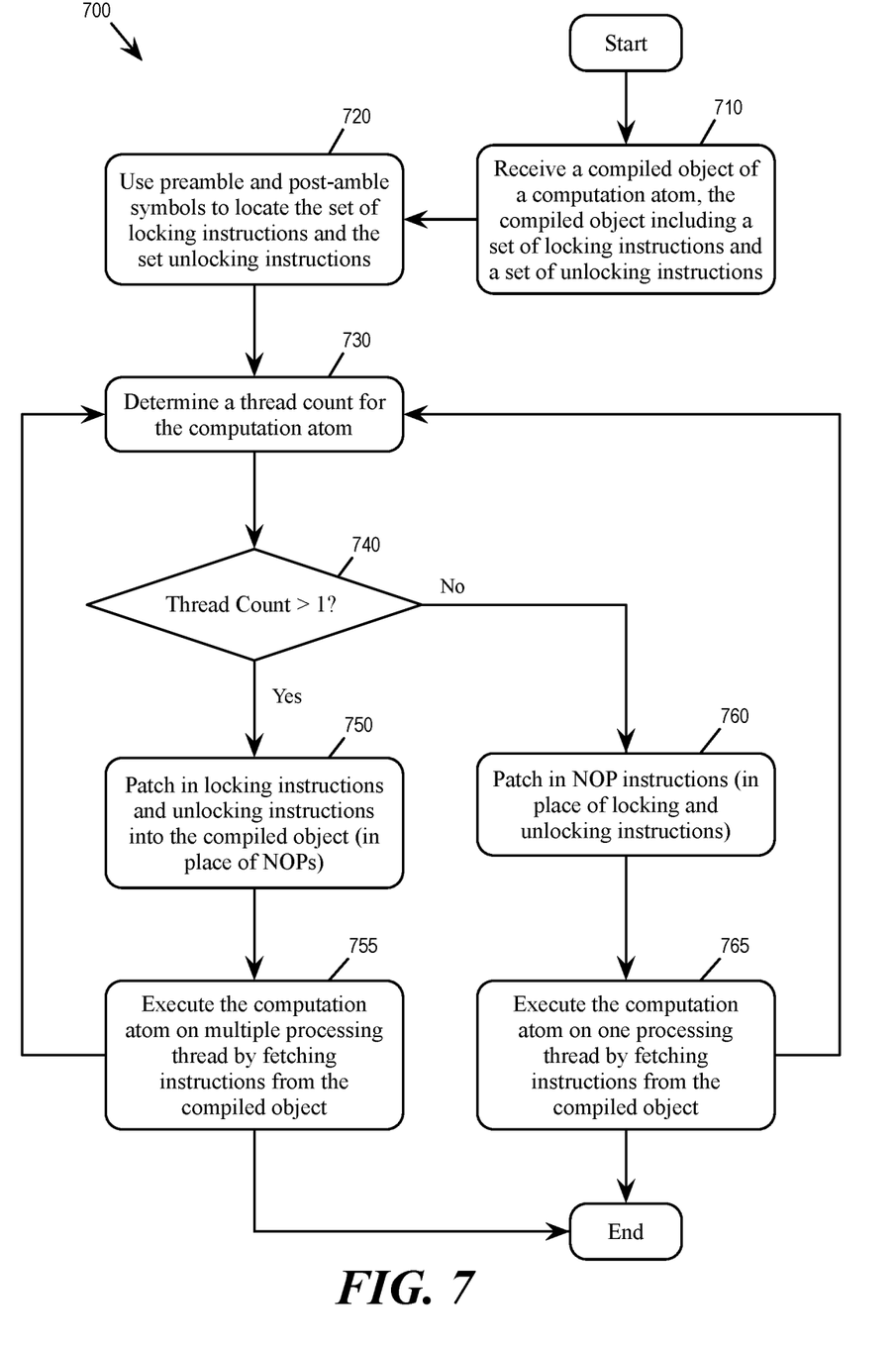
FIG. 7 conceptually illustrates a process for performing elastic threading based on dynamic patching, consistent with an exemplary embodiment.

FIG. 7 conceptually illustrates a process 700 for performing elastic threading based on dynamic patching, consistent with an exemplary embodiment. In some embodiments, one or more processing units (e.g., processor) of a computing device implementing the multithreading system 100 (e.g., the run-time computing device 102) performs the process 700 by executing instructions stored in a computer readable medium.

The process 700 starts when the multithreading system 100 receives (at 710) a compiled object of a computation atom. The compiled object includes a set of locking instructions and a set of unlocking instructions that serve as preamble and postamble to a set of critical operations or behavior instructions that require exclusive access of a memory location. The compiled object may also include a symbol table that includes a preamble symbol that identifies the set of locking instructions and a postamble symbols that identifies the set of unlocking instructions. The multithreading system uses (at 720) the preamble and postamble symbols to locate the set of locking instructions and the set of unlocking instructions.

The multithreading system determines (at 730) a thread count for the computation atom. This thread count corresponds to the number of processing threads that is/are allocated to executing the computation atom. The multithreading system 730 may determine this thread count dynamically based on run-time input into the multithreading system 100, real-time statistics, and other dynamic information. The multithreading system then determines (at 740) whether the dynamically determined thread count is greater than one. If the thread count is greater than one, the process proceeds to 750. Otherwise, the process proceeds to 760.

At 750, the multithreading system patches in (or restores) locking instructions and unlocking instructions into the compiled object in place of the NOP instructions, since the locking and unlocking instructions are needed to prevent data corruption due to concurrent access of a critical resource. In some embodiments, the locking and unlocking instructions are restored from the same name space as the computation atom.

The multithreading system then executes (at 755) the computation atom by fetching the instructions of the compiled object, including the locking and unlocking instructions. The process 700 then returns to 730 to continuously determine the thread count for the computation atom. The process 700 may also end if the processing of the computation atom is complete.

At 760, the multithreading system patches NOP instructions into the compiled object in place of the locking and unlocking instructions, since the locking and unlocking instructions are not needed when there is only one processing thread for the computation atom. The patching operation uses the preamble and postamble symbols in the compiled object to locate the set of locking instructions and unlocking instructions and to determine a number of NOP instructions to patch in place of the locking and unlocking instructions.

The multithreading system then executes (at 765) the computation atom by fetching the instructions of the compiled object, including the NOP instructions that were patched in to replace the locking and unlocking instructions. The process 700 then returns to 730 to continuously determine the thread count for the computation atom. The process 700 may also end if the processing of the computation atom is complete.

By dynamically replacing locking instructions with NOPs, the multithreading system 100 is able to avoid unnecessary acquisition and release of resource locks as well as the expense of activating the processor's branch prediction and out-or-order execution engine. The computation efficiency of the multithreading system is therefore improved.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 1 and 7) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
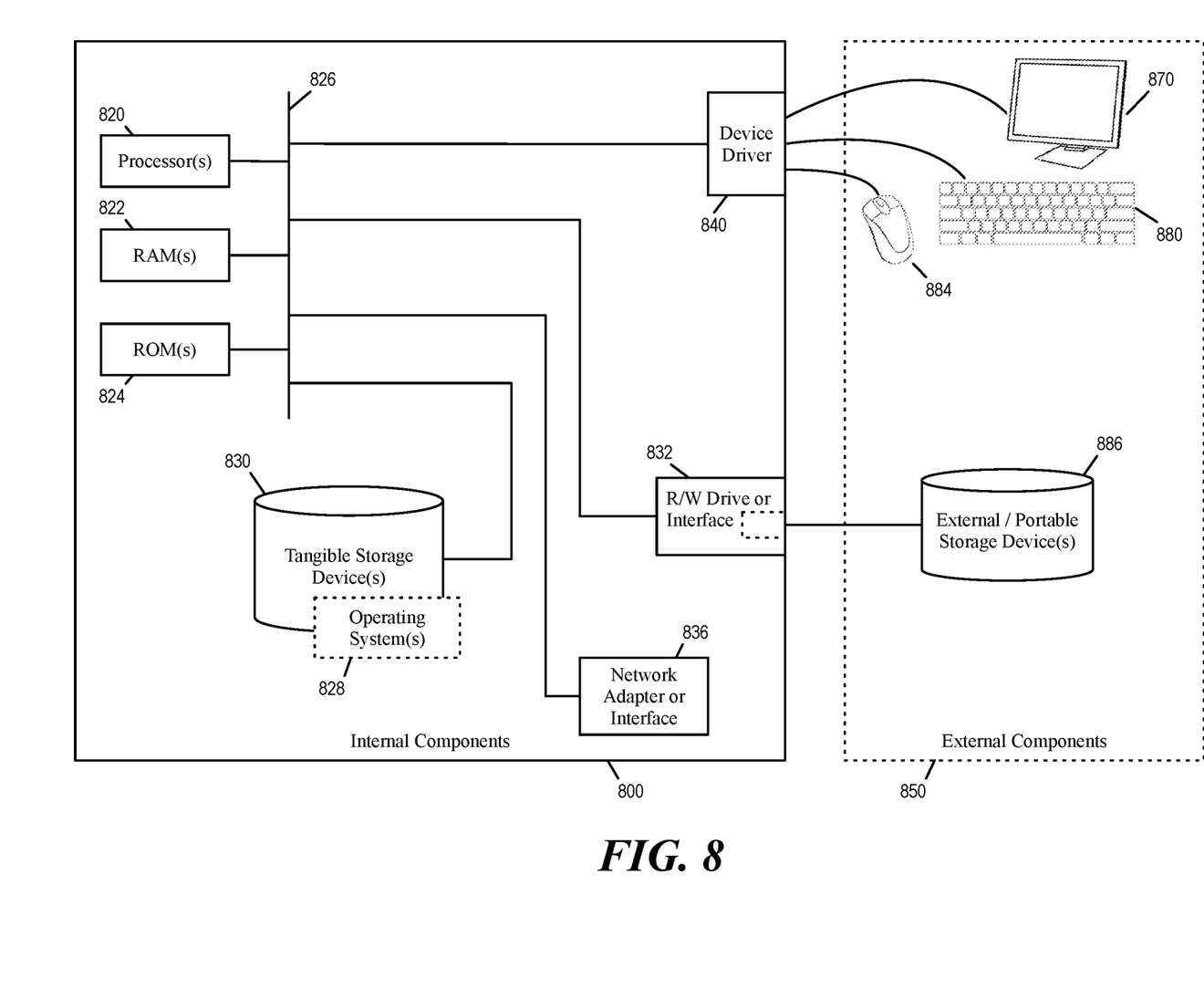
FIG. 8 shows a block diagram of the components of a data processing system in accordance with an illustrative embodiment.

FIG. 8 shows a block diagram of the components of data processing systems 800 and 850 that may be used to implement a multithreading system that perform elastic threading and dynamic patching (e.g., the multithreading system 100) in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing systems 800 and 850 are representative of any electronic device capable of executing machine-readable program instructions. Data processing systems 800 and 850 may be representative of a smart phone, a computer system, PDA, or other electronic devices. Examples of computing systems, environments, and/or configurations that may represented by data processing systems 800 and 850 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 800 and 850 may include a set of internal components 800 and a set of external components 850 illustrated in FIG. 8. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the processes 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the process 700 can be stored on one or more of the respective portable computer-readable tangible storage devices 886, read via the respective R/W drive or interface 832 and loaded into the respective hard drive 830.

The set of internal components 800 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 850 can include a computer display monitor 870, a keyboard 880, and a computer mouse 884. The set of external components 850 can also include touch screens, virtual keyboards, touch pads, pointing devices, and other human interface devices. The set of internal components 800 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving a compiled object of a computing process, the compiled object comprising a set of locking instructions for ensuring exclusive access of a resource by the computing process;
determining a thread count for the computing process;
upon determining that the thread count indicates that a single thread is allocated to execute the computing process, patching the compiled object with a set of no-operation (NOP) instructions in place of the set of locking instructions; and
executing the computing process according to the patched compiled object.

2. The computing device of claim 1, wherein the execution of the set of instructions by the processor further configures the computing device to perform acts comprising:
upon determining that the thread count indicates that two or more threads are allocated to execute the computing process, patching the compiled object with the set of locking instructions in place of the set of NOP instructions.

3. The computing device of claim 1, wherein:
the compiled object comprises a preamble symbol that points to the set of locking instructions, and
the patching comprises using the preamble symbol to locate the set of locking instructions and to determine a number of NOP instructions to patch in place of the set of locking instructions.

4. The computing device of claim 1, wherein:
the compiled object comprises a set of unlocking instructions for releasing the computing resource locked by the set of locking instructions,
the set of NOP instruction is a first set of NOP instructions, and
the execution of the set of instructions by the processor further configures the computing device to perform acts comprising:
upon determining that the thread count indicates that a single thread is allocated to execute the computing process, patching the compiled object with a second set of NOP instructions in place of the set of unlocking instructions.

5. The computing device of claim 4, wherein the execution of the set of instructions by the processor further configures the computing device to perform acts comprising:
upon determining that the thread count indicates that two or more threads are allocated to execute the computing process, patching the compiled object with the set of unlocking instructions in place of the second set of NOP instructions.

6. The computing device of claim 4, wherein:
the compiled object comprises a postamble symbol that points to the set of unlocking instructions, and
patching the compiled object comprises using the postamble symbol to locate the set of unlocking instructions and to determine a number of NOP instructions to patch in place of the set of unlocking instructions.

7. A computer program product comprising:
one or more non-transitory computer-readable storage devices and program instructions stored on at least one of the one or more non-transitory storage devices, the program instructions executable by a processor, the program instructions comprising sets of instructions for:
determining a number of threads for executing a compiled object of a computing process that comprises a set of one or more preamble instructions that is (i) a set of locking instruction for ensuring exclusive access of a computing resource by one thread of the computing process or (ii) a set of placeholder instructions in place of the locking instruction;
upon determining that the number of threads is one, altering the compiled object by replacing the set of preamble instructions with the set of placeholder instructions;
upon determining that the number of threads is two or more, altering the compiled object by replacing the set of preamble instruction with the set of locking instruction; and
providing the altered compiled object for execution by the processor.

8. The computer program product of claim 7, wherein the set of placeholder instructions comprises no-operation (NOP) instructions.

9. The computer program product of claim 7, wherein:
the compiled object comprises a preamble symbol that points to the set of locking instructions, and
replacing the set of preamble instructions with the set of placeholder instructions comprises using the preamble symbol to locate the set of locking instructions and to determine a number of NOP instructions to patch in place of the set of locking instructions.

10. The computer program product of claim 7, wherein the set of locking instructions includes a branching instruction to a routine that locks the resource for the computing process.

11. The computer program product of claim 7, wherein:
the compiled object comprises a set of unlocking instructions for releasing the computing resource locked by the set of locking instructions, and
the set of placeholder instruction is a first set of placeholder instructions, the program instructions further comprising sets of instructions for:
upon determining that the number of threads is one, altering the compiled object by replacing the set of postamble instructions with the set of placeholder instructions.

12. The computer program product of claim 11, the program instructions further comprising sets of instructions for:
upon determining that the number of threads is two or more, altering the compiled object by replacing the set of postamble instruction with the set of unlocking instruction.

13. The computer program product of claim 11, wherein:
the compiled object comprises a postamble symbol that points to the set of unlocking instructions, and
replacing the set of postamble instructions with the set of placeholder instructions comprises using the postamble symbol to locate the set of unlocking instructions and to determine a number of NOP instructions to patch in place of the set of unlocking instructions.

14. A computer-implemented method comprising:
receiving a compiled object of a computing process, the compiled object comprising a set of locking instructions for ensuring exclusive access of a resource by the computing process;
determining a thread count for the computing process;
upon determining that the thread count indicates that a single thread is allocated to execute the computing process, patching the compiled object with a set of no-operation (NOP) instructions in place of the set of locking instructions; and
executing the computing process according to the patched compiled object.

15. The computer-implemented method of claim 14, further comprising:
upon determining that the thread count indicates that two or more threads are allocated to execute the computing process, patching the compiled object with the set of locking instructions in place of the set of NOP instructions.

16. The computer-implemented method of claim 14, wherein:
the compiled object comprises a preamble symbol that points to the set of locking instructions, and
the patching comprises using the preamble symbol to locate the set of locking instructions and to determine a number of NOP instructions to patch in place of the set of locking instructions.

17. The computer-implemented method of claim 14, wherein the set of locking instructions includes a branching instruction to a routine that locks the resource for the computing process.

18. The computer-implemented method of claim 14, wherein:
the compiled object comprises a set of unlocking instructions for releasing the computing resource locked by the set of locking instructions, and
the set of NOP instruction is a first set of NOP instructions, the computer-implemented method further comprising:
upon determining that the thread count indicates that a single thread is allocated to execute the computing process, patching the compiled object with a second set of NOP instructions in place of the set of unlocking instructions.

19. The computer-implemented method of claim 18, further comprising:
upon determining that the thread count indicates that two or more threads are allocated to execute the computing process, patching the compiled object with the set of unlocking instructions in place of the second set of NOP instructions.

20. The computer-implemented method of claim 18, wherein:
the compiled object comprises a postamble symbol that points to the set of unlocking instructions, and
patching the compiled object comprises using the postamble symbol to locate the set of unlocking instructions and to determine a number of NOP instructions to patch in place of the set of unlocking instructions.

* * * * *